(No Model.)
G. A. HYNDS.
TOBACCO PIPE.
No. 598,708. Patented Feb. 8, 1898.
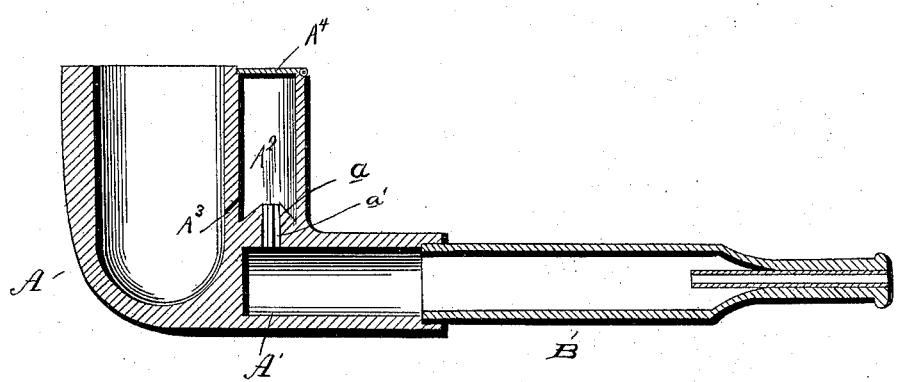
Witnesses.
A. L. Hough
J. M. Pfeiffer
Inventor
George A. Hynds
By Franklin H. Hough
Attorney

UNITED STATES PATENT OFFICE.

GEORGE ALEXANDER HYNDS, OF LITTLE FALLS, NEW YORK.

TOBACCO-PIPE.

SPECIFICATION forming part of Letters Patent No. 598,708, dated February 8, 1898.

Application filed March 2, 1897. Serial No. 625,732. (No model.)

*To all whom it may concern:*

Be it known that I, GEORGE ALEXANDER HYNDS, a citizen of the United States, residing at Little Falls, in the county of Herkimer and State of New York, have invented certain new and useful Improvements in Tobacco-Pipes; and I do declare the following to be a full, clear, and exact description of the invention, such as will enable others skilled in the art to which it appertains to make and use the same, reference being had to the accompanying drawing, and to the letters of reference marked thereon, which forms a part of this specification.
This invention relates to certain new and useful improvements in tobacco-pipes, and especially to the provision of an auxiliary chamber in connection with the bowl of the pipe, into which smoke may be drawn and allowed to settle and become partially cool before passing through into the interior of the stem portion, from which the smoke may be drawn to the mouthpiece.

More especially my invention resides in the construction of a smoke-chamber formed in an integral portion of the bowl and communicating with the recess of the bowl through an inclined duct or passage-way, the said smoke-chamber being provided with a hinged lid, while its lower end, if conically shaped, has two smoke passage-ways leading from its apex through into the space within the integral stem portion of the bowl.

My invention is clearly illustrated in the accompanying drawing, which, with the letters of reference marked thereon, forms a part of this specification, and in which drawing I have shown a vertical central longitudinal section through a pipe embodying my invention.

Reference now being had to the details of the drawing by letter, A designates the bowl of the pipe, apertured, as at A', in its integral stem-engaging portion, to which the stem B is attached. This integral recessed portion of the bowl has two vertical ducts $a'$, which lead from the recess in the integral stem portion into the chamber $A^2$, into which chamber the smoke from the bowl is drawn through the inclined aperture $A^3$. The upper end of the said chamber is provided with a hinged cover $A^4$, by which access may be had to the interior thereof when it is desired to cleanse the chamber. The lower portion of the said chamber has a central raised portion $a$, at the apex of which the ducts $a'$ terminate, and around the outer lower edge of which raised portion is allowed to accumulate any condensed moisture or other foreign matter, which is kept from passing into the stem of the pipe and mouthpiece.

Having thus described my invention, what I claim to be new, and desire to secure by Letters Patent, is—

In a smoking-pipe, the combination with the bowl portion, a smoke-chamber vertically disposed and having communication with the bowl through inclined ducts, of the cover pivoted to the upper portion of the said chamber, the extended recessed portion beneath and at a right angle to the smoke-chamber, the bottom of the said chamber being conical shape and having communication with the said recessed extension through suitable ducts that pass through the conical portion, substantially as shown and described.

In testimony whereof I affix my signature in presence of two witnesses.

GEORGE ALEXANDER HYNDS.

Witnesses:
GUY L. KRETSER,
A. A. HYNDS.